United States Patent
Yamanaka

(10) Patent No.: US 11,016,321 B2
(45) Date of Patent: May 25, 2021

(54) DISPLAY DEVICE HAVING FRAME MEMBER WITH FOLDED-BACK PORTION BONDED TO SEALING MEMBER

(71) Applicant: SHARP KABUSHIKI KAISHA, Sakai (JP)

(72) Inventor: Kazuyuki Yamanaka, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 16/732,712

(22) Filed: Jan. 2, 2020

(65) Prior Publication Data
US 2020/0225529 A1 Jul. 16, 2020

Related U.S. Application Data

(60) Provisional application No. 62/791,323, filed on Jan. 11, 2019.

(51) Int. Cl.
*G02F 1/1333* (2006.01)
*F21V 8/00* (2006.01)

(52) U.S. Cl.
CPC ..... *G02F 1/133308* (2013.01); *G02B 6/0068* (2013.01); *G02B 6/0073* (2013.01); *G02F 1/133311* (2021.01)

(58) Field of Classification Search
CPC ............. G02F 1/133608; G02F 1/1336; G02F 2001/133314; G02F 2001/133317; G02F 2001/13332; G02F 1/133314; G02F 1/133317; G02F 1/13332
See application file for complete search history.

(56) References Cited

U.S. PATENT DOCUMENTS

| | | | | |
|---|---|---|---|---|
| 7,324,174 | B2* | 1/2008 | Hafuka | G02F 1/133608 349/58 |
| 8,120,722 | B2* | 2/2012 | Jung | G02B 6/0021 349/58 |
| 8,746,950 | B2* | 6/2014 | Zhou | G02F 1/133308 362/632 |
| 9,078,341 | B2* | 7/2015 | Suzuki | G02F 1/133308 |
| 9,164,321 | B2* | 10/2015 | Matsumoto | G02F 1/133615 |
| 9,341,874 | B2* | 5/2016 | Jeong | G02F 1/133308 |
| 9,341,892 | B2* | 5/2016 | Chang | G02F 1/133608 |
| RE46,609 | E * | 11/2017 | Kawase | G02F 1/133605 |
| 9,946,104 | B2* | 4/2018 | Ochi | G02F 1/133308 |
| 10,156,746 | B2* | 12/2018 | Samurada | G02F 1/133308 |
| 10,353,255 | B2* | 7/2019 | Takabayashi | G02F 1/136204 |

(Continued)

FOREIGN PATENT DOCUMENTS

JP 2014-050138 A 3/2004

*Primary Examiner* — Ismael Negron
(74) *Attorney, Agent, or Firm* — ScienBiziP, P.C.

(57) ABSTRACT

A display device includes a display panel, a lighting device includes a light-emitting member for back illuminating the display panel and a frame-shaped portion surrounding the light-emitting member from an outer side, a housing accommodating the display panel and the lighting device and having an opening on a display surface side, and a sealing member closing the opening. The frame-shaped portion is fixed to the housing with a fixing member and extends from the lighting device to the sealing member, includes an end disposed adjacent to the sealing member and bonded to the sealing member with an adhesive.

3 Claims, 7 Drawing Sheets

(56) References Cited

U.S. PATENT DOCUMENTS

2014/0120275 A1\* 5/2014 Lu .................... G02F 1/133528
　　　　　　　　　　　　　　　　　　　　428/34.1
2014/0184983 A1\* 7/2014 Wu .................. G02F 1/133308
　　　　　　　　　　　　　　　　　　　　349/61

\* cited by examiner

DISPLAY DEVICE HAVING FRAME MEMBER WITH FOLDED-BACK PORTION BONDED TO SEALING MEMBER

CROSS REFERENCE TO RELATED APPLICATION

This application claims priority from U.S. Provisional Patent application Ser. No. 62/791,323 filed on Jan. 11, 2019. The entire contents of the priority application are incorporated herein by reference.

TECHNICAL FIELD

The technology described herein relates to a display device.

BACKGROUND

In recent years, for example, liquid crystal panels have been generally used as display panels for display of images and information in electronic devices as information terminals and devices such as meters provided for vehicles such as automobiles. These liquid crystal panels do not emit light by themselves. Accordingly, such types of liquid crystal display devices are equipped with backlight devices (lighting devices) that supply light to the liquid crystal panels.

For example, as shown in FIGS. 6 and 7, a backlight device is formed by accommodating a light-emitting member 3 that emits light in a bezel 4 made of, for example, a metal. A liquid crystal panel 5 is integrated with a backlight device 2 with fixing tape 6. The liquid crystal panel 5 and the backlight device 2, which are integrated with each other, are accommodated in a cabinet 7 in the form of a box-like product, with its opening being sealed with a cover glass 8.

Recently, in order to improve the design quality of a product, demands have increased for a narrower frame to increase the occupancy of a display area (AA). According to a conventional configuration, however, because the cover glass 8 is fixed to an opening end face 7A of the cabinet 7 with a double-sided adhesive tape or an adhesive 9, a large bonding area needs to be secured for the opening end face 7A to increase the adhesive force. In addition, in order to prevent moisture and dust from intruding into a liquid crystal display device 1, it is important to secure a sufficiently long distance for an intrusion route increasing the bonding area. That is, it is necessary to set the thickness of the cabinet 7 to a large value and expand the cover glass in accordance with the thickness (bonding area) of the cabinet 7. Such configuration will lead to an increase in the area of a dead area (non-display area NAA) around the display area (AA).

SUMMARY

The technology described herein has been completed on the basis of the above situation and has as its object to make a display device have a smaller frame.

A display device according to the technology described herein includes a display panel configured to display an image, a lighting device disposed behind the back surface of the display panel and including a light-emitting member that emits light to the display panel and a frame-shaped portion surrounding the light-emitting member from an outer side, a housing accommodating the display panel and the lighting device therein and including an opening on the display surface side of the display panel, and a sealing member sealing the opening. The frame-shaped portion is fixed to the housing with a fixing member and extends from the lighting device to the sealing member. The frame-shaped portion includes an end located adjacent to the sealing member and bonded to the sealing member with an adhesive.

According to the technology described herein, a frame width of a display device can e reduced.

DETAILED DESCRIPTION

First Embodiment

The first embodiment will be described with reference to FIGS. 1 and 2. This embodiment will exemplify a liquid crystal display device (an example of a display device) 10 including a liquid crystal panel 12 as a display panel. Note that the X-, Y-, and Z-axes are shown on part of each drawing, and each axial direction corresponds to each direction indicated on each drawing. Assume that the up and down direction is set with reference to FIG. 2, and the upper and lower sides of FIG. 2 respectively correspond to the front and back sides.

Figure 2:
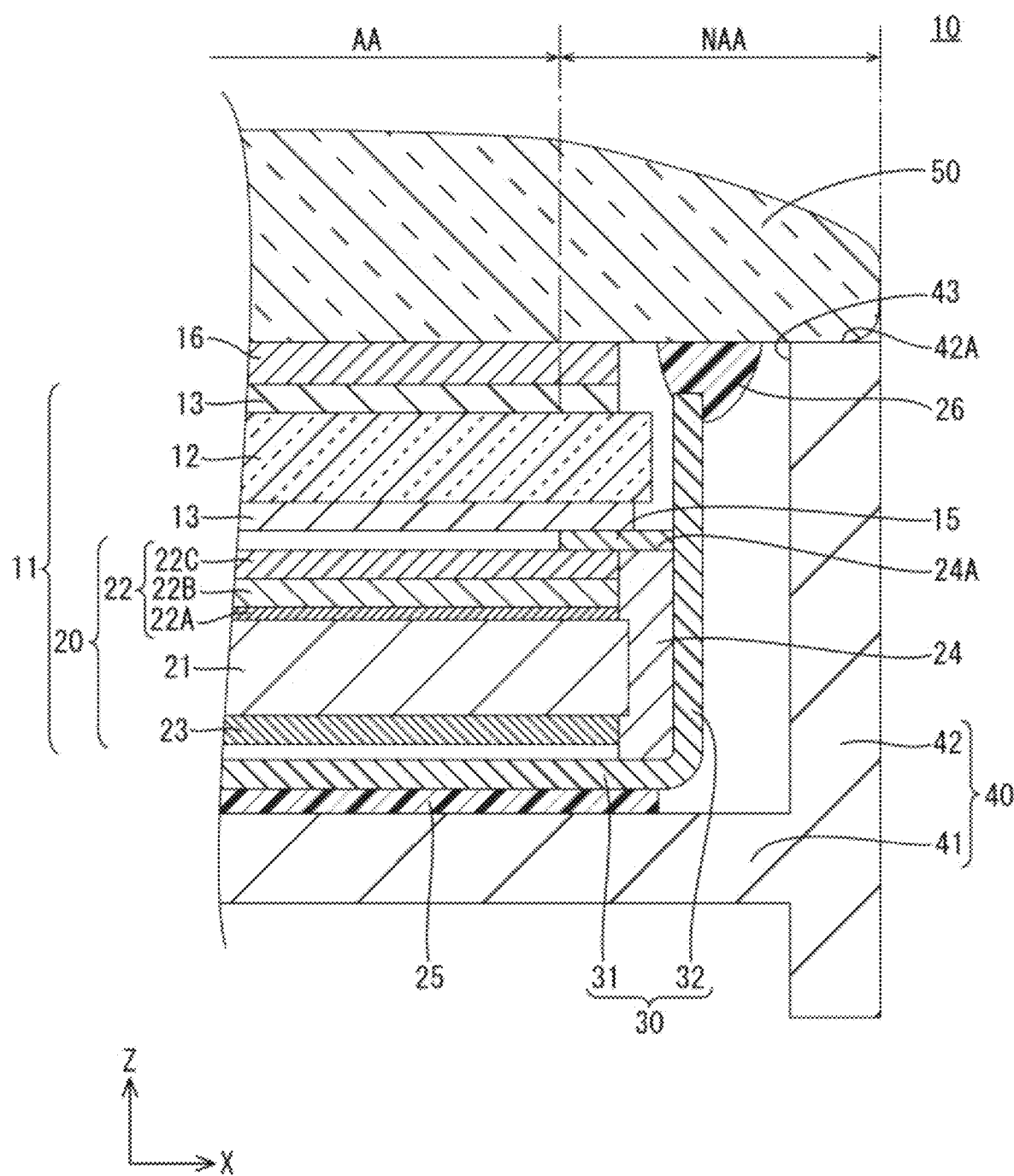
FIG. 2 is a sectional view taken along A-A in FIG. 1.

The liquid crystal display device 10 has a rectangular shape as a whole, and includes, as shown in, for example, FIG. 2, liquid crystal module 11 formed by integrating the plate-like liquid crystal panel 12 configured to display images with a backlight device (an example of a lighting device) 20 that is disposed on the back side (back surface side) relative to the liquid crystal panel 12 and supplies light to the liquid crystal panel 12 by using a panel fixing tape 15. The liquid crystal module 11 is accommodated in a product cabinet (an example of a housing) 40 larger by one size than the liquid crystal module 11. An opening 43 of the cabinet 40 is closed by a cover glass (an example of a sealing member) 50. The liquid crystal display device 10 according to this embodiment is used for various types of electronic devices such as portable information term (for example, cellular phones, smartphones, and tablet personal computers), in-vehicle information terminals (for example, stationary car navigation systems and portable car navigation systems), and portable video game players.

The liquid crystal panel 12 has a rectangular shape in a planar view and a known configuration in which a pair of glass substrates are bonded to each other with a predetermined gap interposed therebetween, and a liquid crystal layer containing liquid crystal molecules as a material with an optical property that changes accompanying electric field application is sealed between the two glass substrates. Switching elements (for example, TFTs) connected to source lines and gate lines perpendicular to each other and pixel electrodes arranged in rectangular regions surrounded by the source lines and the gate lines and connected to the switching elements are planarly arranged in a matrix pattern on the inner surface side of the back-side glass substrate (array substrate or active matrix substrate). In addition, an aligning film and the like are provided on the inner surface side. A color filter formed by planarly arranging colored portions such as R (red), G (green), and B (blue) portions in a matrix pattern according to a predetermined arrangement is provided on the inner surface side of the front-side glass substrate (counter substrate or CF substrate). In addition, the inner surface side is provided with a lattice-like light-shielding layer (black matrix) arranged between the respective colored portions, a counter electrode in a solid facing the pixel electrodes, an aligning film, and the like.

Polarizing plates 13 are arranged on the outer sides of the two glass substrates. The polarizing plates 13, each having a sheet-like shape slightly smaller in dimension than the outer shape of each glass substrate, cover the outer surfaces of the two glass substrate, with the front and back edge portions of the liquid crystal panel 12 being exposed in a picture frame pattern, thereby forming the liquid crystal panel 12.

The liquid crystal panel 12 can display images by using light supplied from the backlight device 20. The front side of the liquid crystal panel 12 is a display surface. Note that the long-side direction, short-side direction, and thickness direction of the liquid crystal panel 12 respectively coincide with the Y-axis direction, the X-axis direction, and the Z-axis direction.

The backlight device 20 has a substantially block-like shape with a rectangular shape in a planar view as a whole like the liquid crystal panel 12. The backlight device 20 includes a plurality of light-emitting diodes (LEDs) as light sources, an LED substrate (an example of a light-emitting member) on which the LEDs are mounted, a light guide plate (an example of a light-emitting member) 21 that guides the light emitted from the LEDs, a plurality of optical sheets (an example of a light-emitting member) 22 stacked on the front side of the light guide plate 21, a reflecting sheet (an example of a light-emitting member) 23 stacked on the back side of the light guide plate 21, a holder 24 holding these members by surrounding them together from the outer circumferential side, and a bezel 30 having a substantially box-like shape open toward the front side (liquid crystal panel 12 side) and internally accommodating the holder 24.

The backlight device 20 is of an edge light type (side light type) based on a one-side light entrance type configured to make light enter the light guide plate 21 only from one side by arranging LEDs on the end face (the lower side in FIG. 1) of the light guide plate 21 which is located on one short side. The backlight device 20 is configured to convert light from the LEDs into planar light and, at the same time, output the light from the opening region of the bezel 30 toward the front-side liquid crystal panel 12. That is, the front side of the backlight device 20 serves as a light output side.

Each component of the backlight device 20 will be described below. Each LED is formed by sealing, with a resin material, an LED chip (LED element) as a semiconductor light-emitting element on a substrate portion fixed to a plate surface of an LED substrate (to be described later). Each LED chip mounted on the substrate portion used in this case is an LED chip configured to have one type of main emission wavelength, more specifically, an LED chip configured to monochromatically emit blue light. On the other hand, the resin material for sealing each LED chip used in this case is a resin material in which a phosphor excited by blue light emitted from the LED chip to emit light of a predetermined color is dispersed and mixed so as to emit white light as a whole.

The LED substrate is formed by forming a wiring pattern for supplying power to LEDs on a band-like base material film made of a thermosetting resin such as urethane resin or epoxy resin, stacking a thermoplastic resin layer such as a polyimide resin layer having thermal plasticity, and intermittently surface-mounting a plurality of LEDs on the thermoplastic resin layer. The LED substrate has a long-side dimension equal to the short-side dimension (width dimension) of the light guide plate 21 (to be described later) and disposed such that the light-emitting surface of each LED is parallel to one short-side end face (light incident surface) of the light guide plate (to be described later).

The light guide plate 21 is made of a transparent synthetic resin such as an acrylic-based resin or polycarbonate and has a plate-like shape with a substantially rectangular shape in a planar view smaller by one size than a bottom wall 31 of the bezel 30 (to be described later). The light guide plate 21 is disposed parallel to the bottom wall 31 of the bezel 30. The long-side direction (lengthwise direction) and short-side direction (widthwise direction) of the light guide plate 21 respectively coincide with the Y-axis direction and the X-axis direction, and the plate thickness direction perpendicular to the plate surface of the light guide plate 21 coincides with the Z-axis direction.

Figure 1:
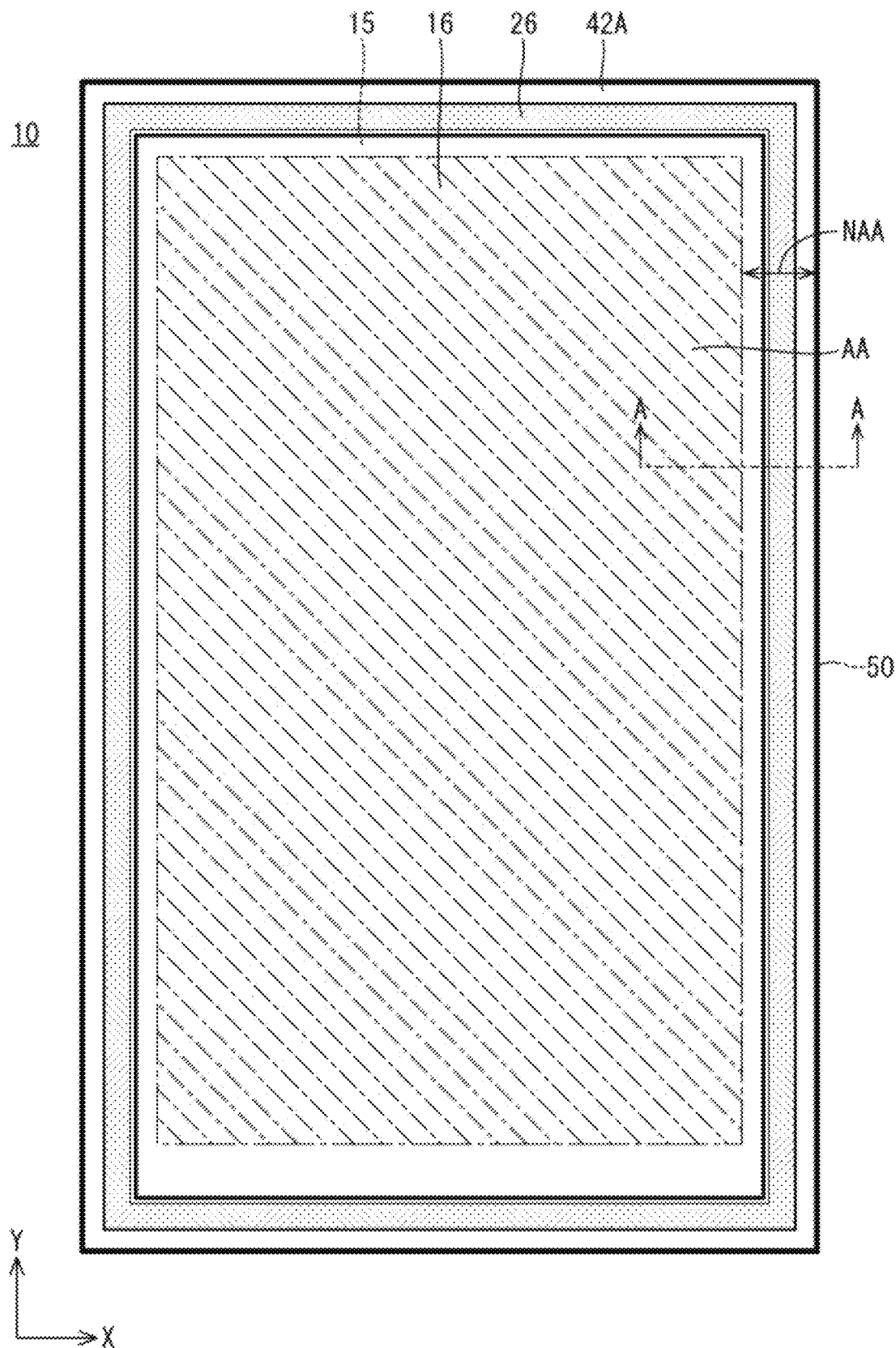
FIG. 1 is a plan view of a liquid crystal display device according to a first embodiment.

Of the outer circumferential end faces of the light guide plate 21, the short-side end face on the lower side shown in FIG. 1 serves as a light incident surface that parallelly faces the a light-emitting surfaces of the LEDs through a predetermined distance and receives light from the LEDs. Of the pair of plate surfaces, the upper surface (front surface) serves as a light exit surface from which light entering the light guide plate 21 exits toward the liquid crystal panel 12. Of the pair of plate surfaces, the lower surface (back surface) serves as a reflecting surface that reflects, toward the light exit surface, light propagating from the inside of the light guide plate 21 to the lower surface (back surface).

The light guide plate 21 is disposed immediately below the liquid crystal panel 12. An optical sheet 22 is stacked on the surface (light exit surface) of the light guide plate 21. The optical sheet 22 has a flat, rectangular sheet-like shape, with its long-side direction and short-side direction respectively coinciding with the Y-axis direction and the X-axis direction. The optical sheet 22 is interposed between the light guide plate 21 and the liquid crystal panel 12 to transmit exit light from the light guide plate 21 and make the transmitted light exit toward the liquid crystal panel 12 while adding a predetermined optical effect to the light.

Note that the optical sheet 22 according to this embodiment has a three-layer structure having a diffusion sheet 22A, lens sheet 22B, and a reflective polarizing sheet 22C stacked on each other from the lower layer side in the order named.

On the other hand, the reflecting sheet 23 is stacked on the back surface (reflecting surface) of the light guide plate 21. The reflecting sheet 23 is formed from a white synthetic resin sheet member having a surface with excellent light reflectivity. The reflecting sheet 23 can efficiently cause light propagating in the light guide plate 21 and exiting from the reflecting surface to rise toward the front side (light exit surface).

The holder 24 is made of, for example, synthetic resin such as polycarbonate or a metal material, and has a rectangular frame-like shape in a planar view. The height dimension of the holder 24 is almost equal to or slightly larger than the dimension of the multilayer structure formed by stacking the optical sheet 22 and the reflecting sheet 23 on the light guide plate 21. The holder 24 is configured to internally hold the optical sheet 22, the light guide plate 21, the reflecting sheet 23, and the LED substrate altogether. The holder 24 is set such that an upper end face 24A is flush with the upper surface of the optical sheet 22 while the holder 24 is holding these members.

The holder 24 is fitted in the bezel 30 having a substantially box-like shape open toward the front side (liquid crystal panel 12 side) such that the outer surface of the holder 24 is held against the bezel 30. The bezel 30 will be described in detail later. Note that the long-side direction, short-side direction, and height direction of the holder 24 respectively coincide with the Y-axis direction, the X-axis direction, and the Z-axis direction.

The liquid crystal panel 12 described above is fixed to the end edge portions of the holder 24 and the optical sheet 22 of the backlight device 20 with the panel fixing tape 15. The panel fixing tape 15 is made of a synthetic resin and formed by applying an adhesive to both the surfaces of a base material having a rectangular frame-like shape extending along the ends of the liquid crystal panel 12 as a whole. The base material of the panel fixing tape 15 has a black surface to have a light blocking effect.

While the panel fixing tape 15 is bonded at a predetermined bonding position, the outer edge portion of the panel fixing tape 15 projects from the outer edge portion of the liquid crystal panel 12 but is located inside the outer edge portion of the holder 24. In the liquid crystal display device 10, the inside of the frame-like area where the panel fixing tape 15 is disposed is a display area AA configured to display images, and an area around the display area AA is a non-display area NAA configured not to display any images.

The bezel 30 according to this embodiment is made of a metal material such as an aluminum plate or electro galvanized steel sheet (SECC) and has a substantially box-like shape having a rectangular shape in a planar view and opening toward the front side (liquid crystal panel 12 side). The bezel 30 accommodates the holder 24 holding at least the light guide plate 21 therein such that the outer surface of the holder 24 is held against the bezel 30. The bezel 30 includes a rectangular bottom wall 31 and side walls (an example of a frame-shaped portion) 32 integrally extending upward from the end edge portions (a pair of long sides and a pair of short sides) of the bottom wall 31 toward the front side. The long-side direction and short-side direction of the bottom wall 31 of the bezel 30 respectively coincide with the Y-axis direction and the X-axis direction. The direction perpendicular to the plate surface coincides with the Z-axis.

The bottom wall 31 supports the holder 24 accommodated in the bezel 30 from the back side. The side walls 32 are arranged to surround the members accommodated in the bezel 30 from the outer circumferential side so as to have a rectangular frame-like shape as a whole. The height dimension of each side wall 32 is set to almost equal to the height dimension from the lower end of the holder 24 to the upper end (display surface) of the liquid crystal panel 12. That is, the side walls 32 surround the liquid crystal panel 12 as well as the holder 24. An assembly including the liquid crystal panel 12 and the holder 24 housed in the bezel 30 (an assembly including the liquid crystal panel 12 and the backlight device 20 that are combined) will be referred to as the liquid crystal module 11 hereinafter.

In this embodiment, the liquid crystal module 11 is accommodated in the cabinet (an example of a housing) 40. The cabinet 40 is made of a synthetic resin and has a substantially box-like shape having a rectangular shape larger than the bezel 30 in a planar view and the opening 43 open to the front side (the display surface side of the liquid crystal panel 12). The cabinet 40 includes a rectangular cabinet-side bottom wall 41 and cabinet-side side walls 42 extending upward from the end edge portions of the cabinet-side bottom wall 41 toward the front side. The long-side direction and short-side direction of the cabinet-side bottom wall 41 respectively coincide with the Y-axis direction and the X-axis direction. The direction perpendicular to the plate surface coincides with the Z-axis.

The cabinet-side bottom wall 41 is configured to support the liquid crystal module 11 from the back side, and the lower surface of the liquid crystal module 11 (the bottom wall 31 of the bezel 30) is fixed to the upper surface of the cabinet-side bottom wall 41 with a fixing tape (an example of a fixing member) 25. The cabinet-side side walls 42 surround the liquid crystal module 11 with a gap and the side walls 32 of the bezel 30 interposed therebetween so as to have a rectangular frame-like shape as a whole. The height dimension of each cabinet-side side wall 42 is set to be slightly higher than that of the liquid crystal module 11 disposed in the cabinet 40. The end of a cover glass (an example of a sealing member) 50 having translucency is placed on an upper end face 42A of each cabinet-side side wall 42, and the end of the cover glass 50 is supported from below. Most of the central portion of the lower surface (back surface) of the cover glass 50 is bonded to the polarizing plate 13 of the liquid crystal panel 12 with an adhesive 16 having translucency.

The side walls 32, of the bezel 30 of the liquid crystal module 11 accommodated in the cabinet 40, which extend to near the upper end (display surface) of the liquid crystal panel 12, i.e., portions near the upper ends of the side walls 32 extending to near the cover glass 50, are bonded to the cover glass 50 throughout the entire circumference with an adhesive 26. Note that the adhesive 26 has waterproofness.

The liquid crystal display device 10 according to this embodiment has the configuration described above. The operational effect of the liquid crystal display device 10 will be described next. The liquid crystal display device 10 according to this embodiment includes the liquid crystal panel 12 that displays images, the backlight device 20 disposed behind the back surface of the liquid crystal panel and having the LEDs that emit light toward the liquid crystal panel 12, the LED substrate, the light guide plate 21, the optical sheet 22, the reflecting sheet 23, and the bezel 30 having the side walls 32 surrounding them from the outer side, the cabinet 40 accommodating the liquid crystal panel and the backlight device 20 therein. The cabinet 40 includes the opening 43 on the display surface side of the liquid crystal panel 12, and the cover glass 50 sealing the opening 43. The bezel 30 is fixed to the cabinet 40 with the fixing tape 25, with the side walls 32 extending from the backlight device 20 toward the cover glass 50. The side walls 32 include ends that are located adjacent to the cover glass 50 and bonded to the cover glass 50 with the adhesive 26.

According to this configuration, because the cover glass 50 is fixed to the cabinet 40 through the bezel 30, it is not necessary, unlike the prior art, to provide an adhesive layer for fixation between the cover glass 50 and the cabinet 40 (the upper end faces of the cabinet-side side walls 42). Even if an adhesive layer is auxiliarily provided between the cover glass 50 and the cabinet 40, there is no need to secure a large bonding area to obtain strong fixing strength.

The opening of the bezel 30 is closed by the cover glass 50 to seal the liquid crystal module 11 accommodated in the bezel 30. Accordingly, waterproofness and dustproofness already been secured in this sealed area. It is, therefore, unnecessary to provide any adhesive layer between the cover glass 50 and the cabinet 40 as a waterproof/dustproof measure.

Accordingly, there is no need to increase the thickness of each cabinet-side side wall 42 to increase the adhesive strength or provide a waterproof/dustproof measure. This makes it possible to reduce the sizes of the cabinet 40 and the cover glass 50. This can reduce the width of the non-display area NAA and achieve a reduction in the frame width of the liquid crystal display device 10. In addition, the degree of freedom in design of the cabinet 40 improves. Furthermore, the use of the adhesive 26 having waterproofness leads to excellent water resistance.

Note that the adhesive 26 that fixes the cover glass 50 to the bezel 30 is configured to be provided inside the cabinet 40, and hence is not directly exposed to the external environment. Even if moisture and dust intrude into the cabinet 40 through the gap between the cover glass 50 and the cabinet 40, the amounts of moisture and dust are much smaller than those when the adhesive 26 is exposed to the external environment. Accordingly, there is no need to secure a wide boding area for the adhesive 26 as a waterproof/dustproof measure. Note that auxiliarily providing an adhesive layer between the cover glass 50 and the cabinet 40 will reduce the risk of the intrusion of moisture and dust into the cabinet 40.

Second Embodiment

Figure 3:
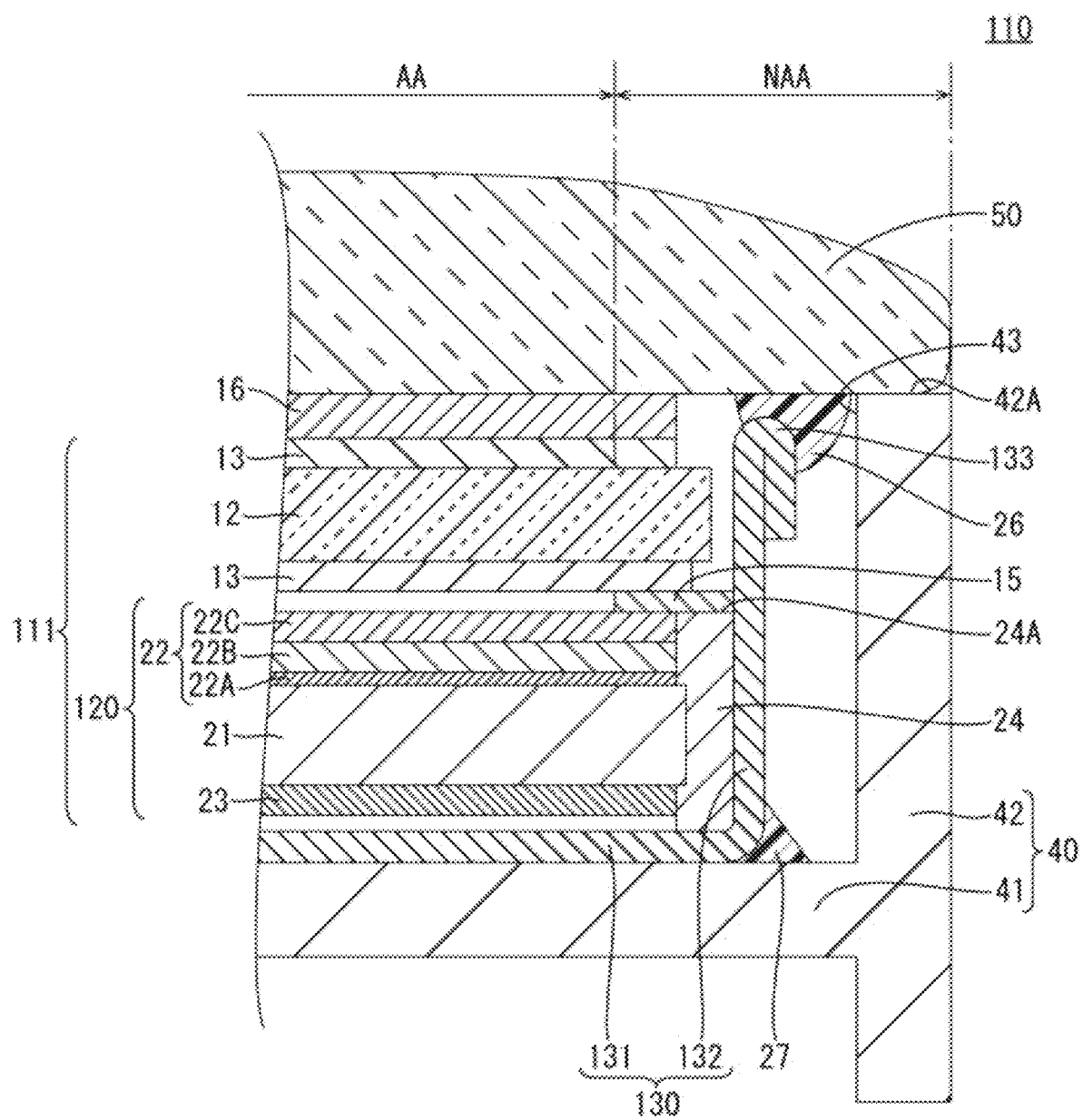
FIG. 3 is a sectional view of a liquid crystal display device according to a second embodiment.

The second embodiment will be described next with reference to FIGS. 2 and 3. Only components different from those of the first embodiment will be described below. The same reference numerals as those in the first embodiment denote the same components, and a redundant description will be omitted. In addition, components partially different from those of the first embodiment will be denoted by the reference numerals obtained by adding 100 to the corresponding reference numerals in the first embodiment.

A liquid crystal display device 110 according to this embodiment differs in the shape of a bezel 130 of a backlight device 120 from the liquid crystal display device according to the first embodiment. The upper end edges of side walls 132 of the bezel 130 according to this embodiment are folded back throughout the entire circumference at folded-back sections 133 toward the backlight device 120 (downward). This configuration makes it possible to secure a larger bonding area on the upper end edge of each side wall 132 to which an adhesive 26 is applied. Note that the total height dimension of each side wall 132 is the same as that in the first embodiment.

The liquid crystal display device 110 also differs in the fixing structure of a liquid crystal module 111 (the bezel 130 of the backlight device 120) with respect to a cabinet 40 from the liquid crystal display device according to the first embodiment. In the first embodiment, the back surface of the bottom wall 31 of the bezel 30 is fixed to the upper surface of the cabinet-side bottom wall 41 with the fixing tape 25. In the second embodiment, the side walls 132 of the bezel 130 are fixed to the cabinet-side bottom wall 41 by applying an adhesive 27 (an example of a fixing member) to corner portions between the side walls 132 and the cabinet-side bottom wall 41 throughout the entire circumference.

The configuration of this embodiment improves the adhesive strength between the bezel 130 and the cover glass 50 in addition to the operational effect of the first embodiment.

In addition, this configuration can reduce the number of components and simplify the manufacturing process because when the adhesive 26 is applied to the upper ends of the side walls 132 of the bezel 130, it is only required to also apply the adhesive 27 to the corner portions between the side walls 132 of the bezel 130 and the cabinet-side bottom wall 41 without bonding any fixing tape to the back surface of a bottom wall 131 of the bezel 130 or the upper surface of the cabinet-side bottom wall 41.

Third Embodiment

Figure 4:
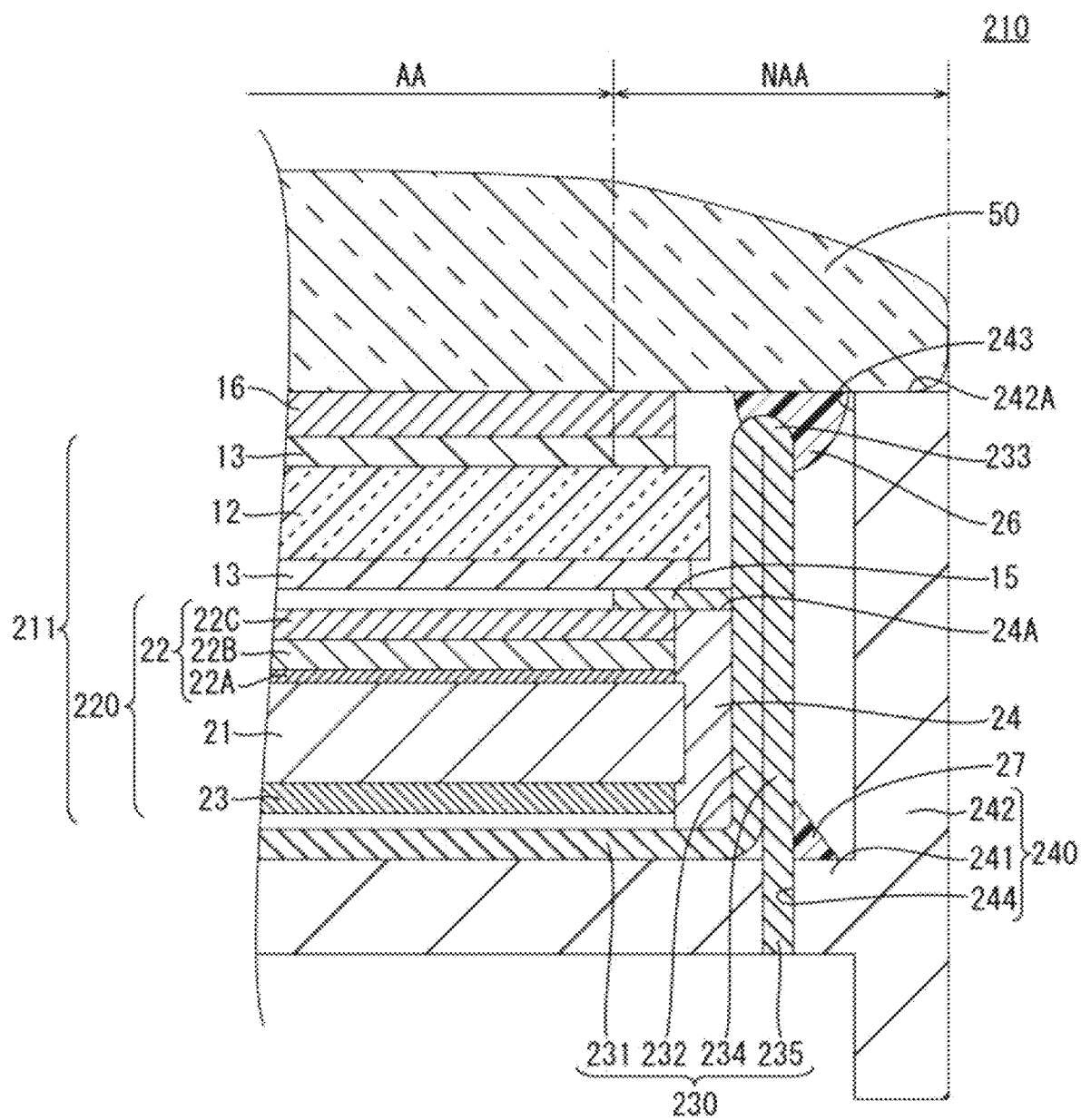
FIG. 4 is a sectional view of a liquid crystal display device according to a third embodiment.

The third embodiment will be described next with reference to FIGS. 3 and 4. Only components different from those of the first embodiment will be described below. The same reference numerals as those in the first embodiment denote the same components, and a redundant description will be omitted. In addition, components partially different from those of the first embodiment will be denoted by the reference numerals obtained by adding 200 to the corresponding reference numerals in the first embodiment.

A liquid crystal display device 210 according to this embodiment differs in the shape of a bezel 230 of a backlight device 220 from the liquid crystal display devices according to the first and second embodiments. In addition, the configuration of a cabinet 240 partially differs from the corresponding component. As in the second embodiment, the upper end edges of side walls 232 of the bezel 230 according to the third embodiment are folded back to the outer circumferential side at folded-back sections 233 toward the backlight device 220 (downward) throughout outer circumference. In addition, portions of folded-back pieces 234 extend downward beyond the back surface of the backlight device 220 so as to form projections 235 projecting toward the back surface of the backlight device 220.

Hole portions 244 are formed through a cabinet-side bottom wall 241 at positions corresponding to the projections 235 as to allow the projections 235 to be positioned by being neatly fitted inside. Note that the dimension of each projection 235 is set such that while the projection 235 is fitted in the hole 244, the distal end face (lower surface) of the projection 235 is flush with the lower surface (outer surface) of the cabinet-side bottom wall 241. An adhesive 27 for fixing the bezel 230 to the cabinet 240 is applied to corner portions between the folded-back pieces 234 and the upper surface of the cabinet-side bottom wall 241 so as to surround the folded-back pieces 234. Note that as in the second embodiment, the adhesive 27 is applied to the corner portions of the side walls 232 of the bezel 230 and a cabinet side bottom wall 241 in regions where the projections 235 are not provided.

This configuration further firmly fixes a liquid crystal module 211 (bezel 230) to the cabinet 240 in addition to the operational effects of the first and second embodiments. Even if moisture and dust try to intrude into the cabinet 240 through the gaps between the projections 235 and the holes 244, the adhesive 27 applied between the folded-back pieces 234 and the upper surface of the cabinet-side bottom wall 241 prevents the intrusion of moisture and dust and keeps them from reaching an adhesive 26 applied to the folded-back sections 233. This makes it possible to more reliably keep moisture and dust from intruding into the liquid crystal module 211.

Modification of Third Embodiment

Figure 5:
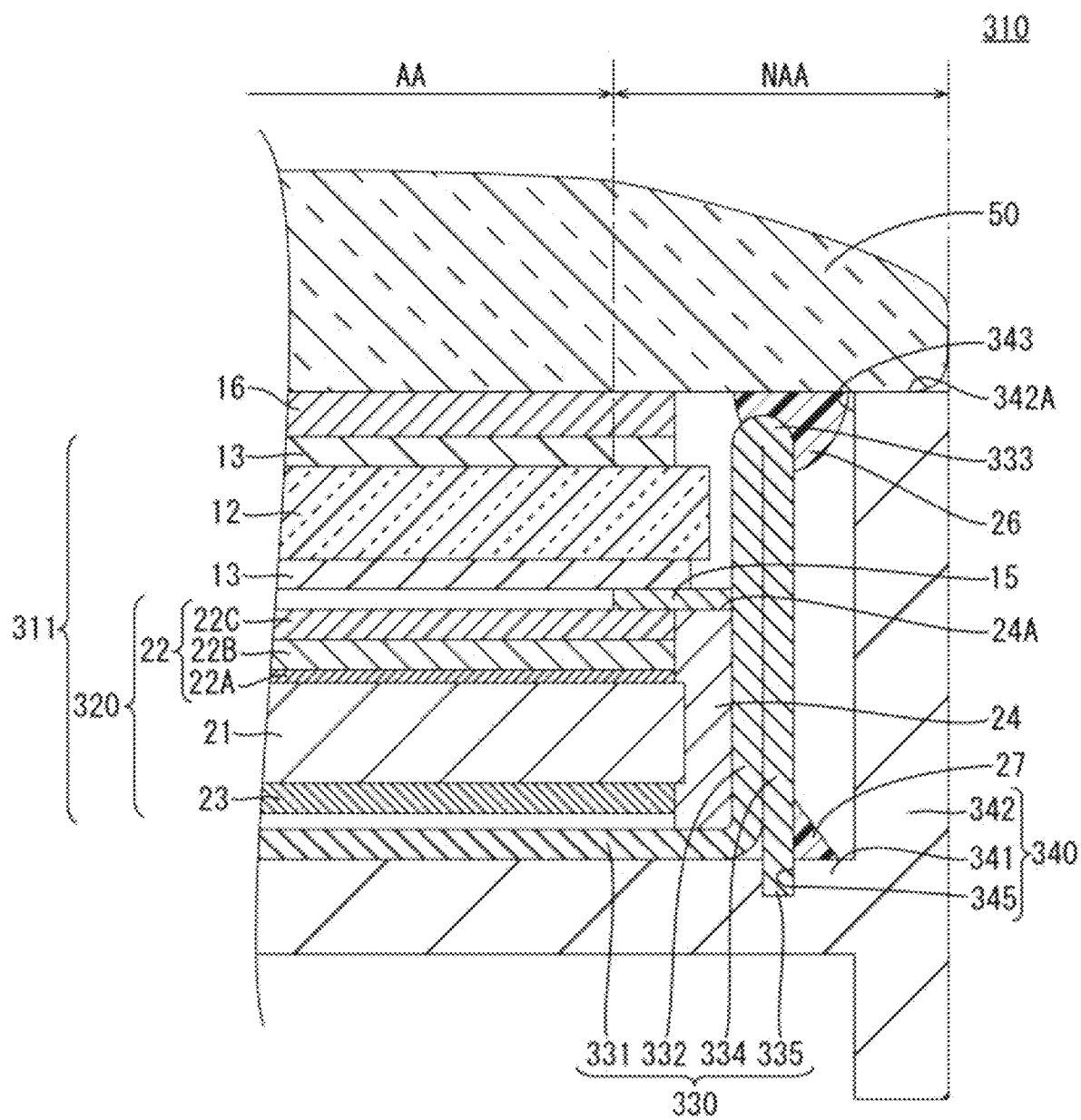
FIG. 5 is a sectional view of a liquid crystal display device according to a modification of the third embodiment.
Figure 6:
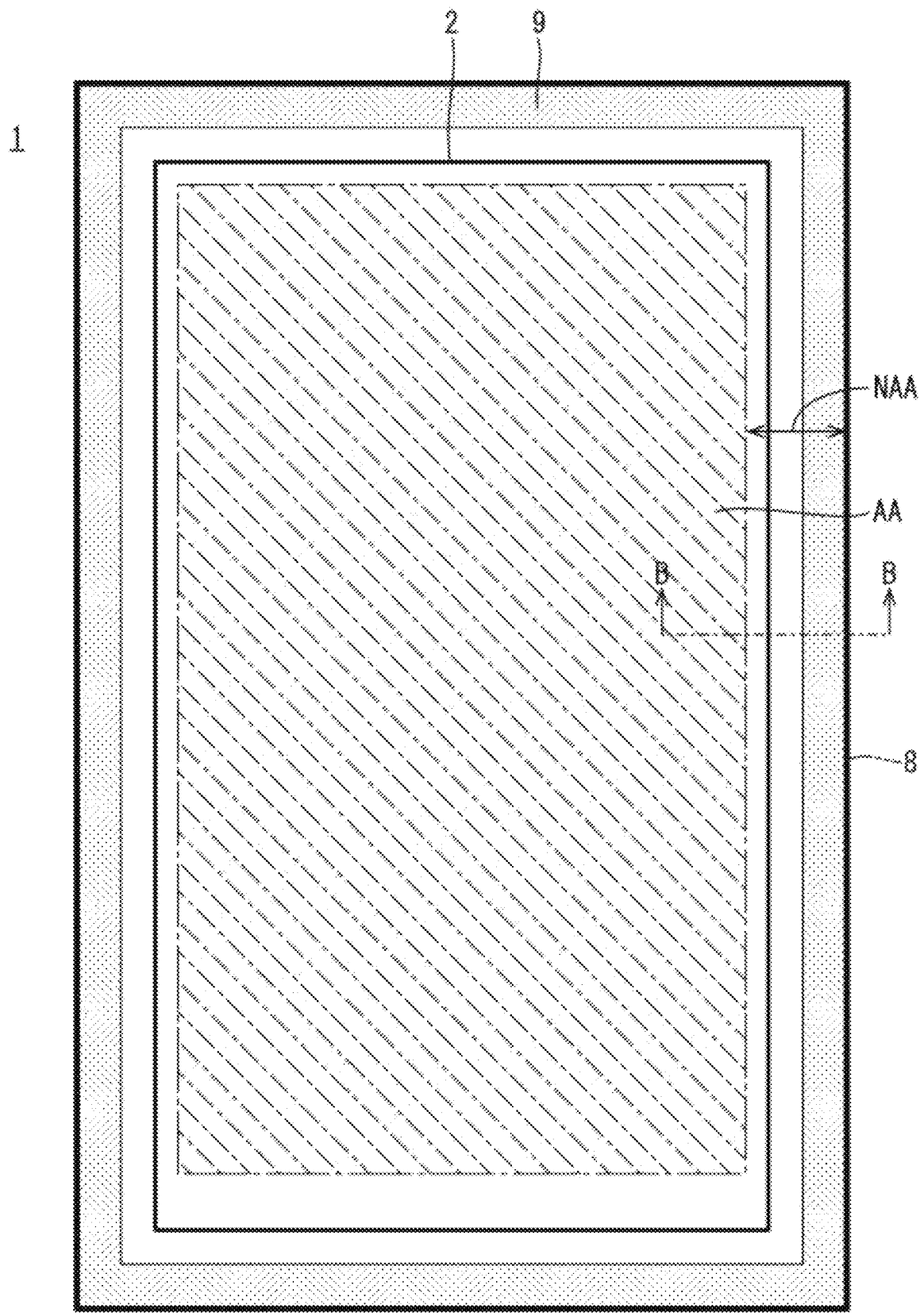
FIG. 6 is a plan view of a conventional liquid crystal display device.
Figure 7:
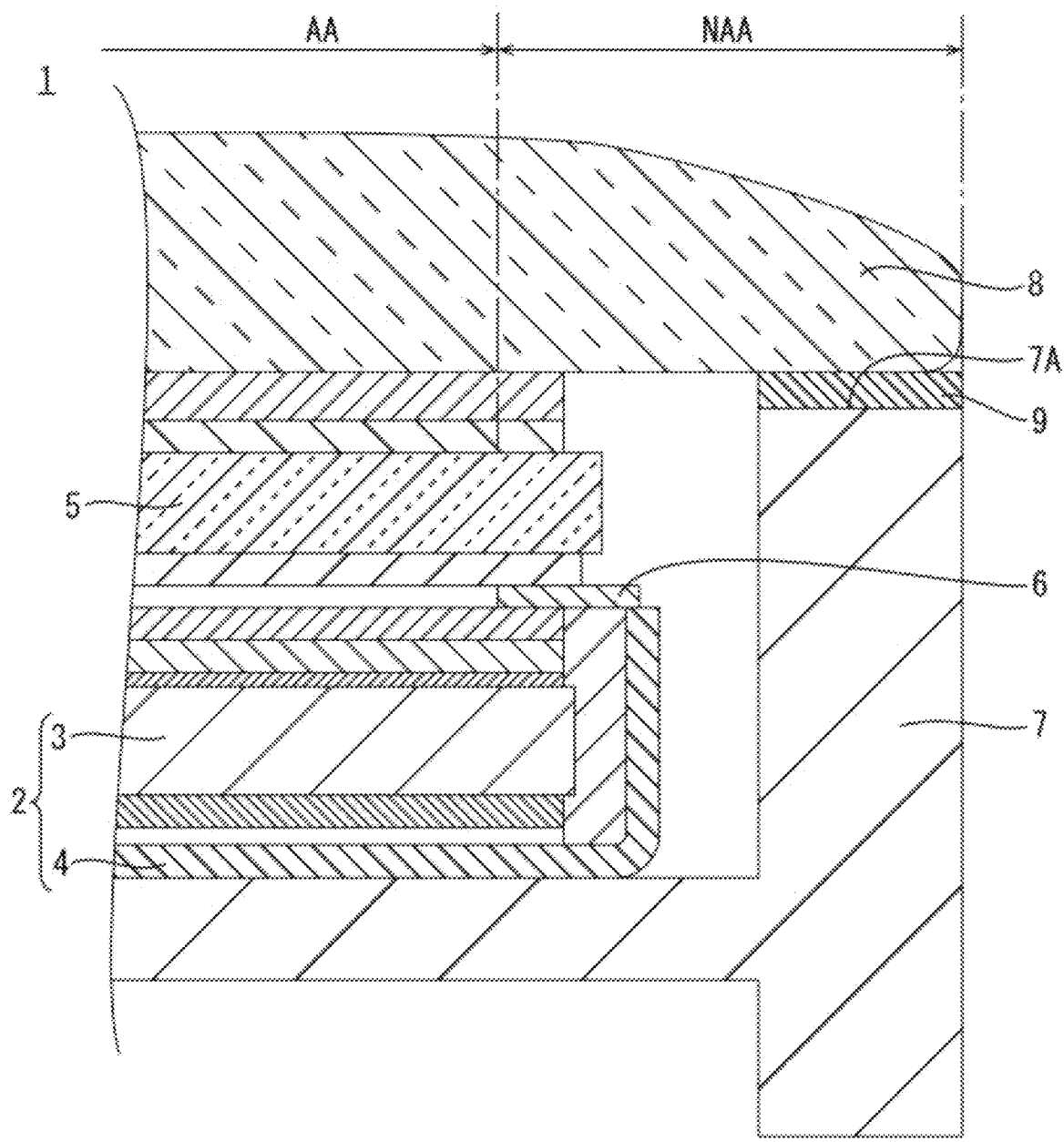
FIG. 7 is a sectional view taken along B-B in FIG. 6.

A modification of the third embodiment will be described with reference to FIG. 5. Only components different from those of the first embodiment will be described below. The same reference numerals as those in the first embodiment denote the same components, and a redundant description will be omitted. In addition, components partially different from the first embodiment will be denoted by the reference numerals obtained by adding 300 to the corresponding reference numerals in the first embodiment.

The third embodiment described above is configured such that the holes 244 in which the projections 235 are fitted are formed through the cabinet-side bottom wall 241 at positions corresponding to the projections 235. However, as shown in FIG. 5, projections 335 may be formed so as to be shorter than the corresponding portions in the third embodiment, and bottomed groove-shaped recess 345 may be provided on a cabinet side bottom wall 341 instead of the holes 244. This configuration makes it possible to further reduce the risk of the intrusion of moisture and dust into a cabinet 340.

Other Embodiments

The technology described herein is not limited to the embodiments described above with reference to the accompanying drawings. For example, the following embodiments are included in the technical range of technology described herein.

(1) The above embodiments have exemplified the configurations without any bonding members between the upper end faces 42A, 242A, and 342A of the cabinet-side side walls 42, 242, and 342 and the cover glasses 50. However, these regions may be auxiliarily provided with an adhesive member.

(2) Each folded-back section 133 according to the second embodiment may be configured to be folded inside the bezel 130 instead of outside.

(3) The length dimensions of folded pieces 334 folded at the folded-back sections 133, 233, and 333 are not limited to those in the above embodiments. For example, each folded piece may extend to the lower surface of the bottom wall of the bezel and come into contact with the upper surface of the cabinet-side bottom wall.

(3) The types of the adhesives 26 and 27 to be used are not limited to those in the above embodiments, and various types can be selected as needed.

(4) The gaps between the side walls 32, 132, 232, and 332 of the bezels 30, 130, 230, and 330 and the cabinet-side side walls 42, 242, and 342 may be filled with an adhesive.

(5) It is not always necessary to secure gaps between the side walls 32, 132, 232, and 332 of the bezels 30, 130, 230, and 330 and the cabinet-side side walls 42, 242, and 342. That is, configuration without any gaps is incorporated in the technical range of the technology described herein.

(6) In the above embodiments, the bezels 30, 130, 230, and 330 have box-like shapes having the bottom walls 31, 131, 231, and 331. However, each bezel may be a frame-like member constituted by only side walls, for example, a bezel including a lower end closed by a reflecting sheet.

(7) In the above embodiments, the bezels 30, 130, 230, and 330 are made of a metal, and the side walls 232 and 332 are folded into double-layer structures provided with the projections 235 and 335. However, each bezel is not limited to a metal bezel. In addition, the projections 235 and 335 are not limited to those formed as the distal ends of the folded-back pieces 234 and 334, and may be obtained by directly forming projections on bottom walls or side walls without any folded portions.

(8) The above embodiments have exemplified the configurations in which the openings 43, 243, and 343 of the cabinets 40, 240, and 340 are closed by the cover glasses 50. However, configurations in which components that close the openings are not limited to the cover glasses 50. For example, configurations in which the openings are closed by touch panels also included in the technical range of the technology described herein.

(9) In the third embodiment described above, the folded-back pieces 234 of the bezel 230 are fixed to the cabinet 240 inside the cabinet 240 with the adhesive 27. However, the adhesive 27 may be applied to the outside of the cabinet 240 so as to fill the holes 244.

The invention claimed is:

1. A display device comprising:
a display panel configured to display an image;
a lighting device disposed behind a back surface of the display panel and including a light-emitting member that emits light to the display panel and a frame-shaped portion surrounding the light-emitting member from an outer side;
a housing accommodating the display panel and the lighting device therein and including an opening on a display surface side of the display panel; and
a sealing member sealing the opening, wherein
the frame-shaped portion is fixed to the housing with a fixing member and extends from the lighting device to the sealing member,
the frame-shaped portion includes an end disposed adjacent to the sealing member and bonded to the sealing member with an adhesive, and
the end of the frame-shaped portion includes a folded-back section folded toward the lighting device at the end located adjacent to the sealing member.

2. The display device according to claim 1, wherein
the frame-shaped portion includes an extending section extending from the folded-back section,
the extending section includes a projection projecting beyond a back surface of the lighting device to an opposite side to the sealing member, and
the housing includes a hole or a groove in which the projection is fitted.

3. The display device according to claim 2, wherein the folded-back piece is bonded to a bottom portion of the housing with an adhesive, the bottom portion being disposed behind the back surface of the lighting device.

* * * * *